United States Patent
Tyree

(10) Patent No.: US 8,047,070 B2
(45) Date of Patent: Nov. 1, 2011

(54) FAST RESPONSE PROJECTILE ROLL ESTIMATOR

(75) Inventor: Anthony K. Tyree, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 190 days.

(21) Appl. No.: 12/561,004

(22) Filed: Sep. 16, 2009

(65) Prior Publication Data

US 2011/0061456 A1 Mar. 17, 2011

(51) Int. Cl.
  *G01L 5/14* (2006.01)
  *G01C 21/00* (2006.01)
(52) U.S. Cl. .......................................... 73/167; 701/220
(58) Field of Classification Search .......... 73/1.75–1.78, 73/167, 178 R; 701/205, 207, 216–217, 701/210, 220; 702/189–190, 194
See application file for complete search history.

(56) References Cited

U.S. PATENT DOCUMENTS

| 5,886,257 A | 3/1999 | Gustafson |
| 6,208,936 B1 * | 3/2001 | Minor et al. ................. 701/220 |
| 7,395,987 B2 | 7/2008 | Lindquist |
| 2009/0299579 A1 * | 12/2009 | Hac et al. ....................... 701/46 |

* cited by examiner

*Primary Examiner* — Lisa Caputo
*Assistant Examiner* — Roger Hernandez-Prewitt
(74) *Attorney, Agent, or Firm* — SoCal IP Law Group LLP; John E. Gunther; Steven C. Sereboff

(57) ABSTRACT

An apparatus and method for estimating a roll angle of a projectile may include a measurement unit outputting roll rate, yaw rate, and pitch rate signals indicative of rotation rates about substantially orthogonal roll, yaw, and pitch axes, the roll axis substantially aligned with a longitudinal axis of the projectile. A controller may sample the roll rate, yaw rate, and pitch rate signals to obtain time sequential roll rate, yaw rate, and pitch rate samples; calculate time sequential cumulative roll estimates by summing the roll rate samples; calculate time sequential gravity vector estimates from the corresponding yaw rate and pitch rate samples; de-roll each gravity vector estimate based on the corresponding cumulative roll estimate; filter the de-rolled gravity vector estimates to determine a filtered initial roll estimate; and add the filtered initial roll estimate to the current cumulative roll estimate to provide a current roll angle estimate.

16 Claims, 6 Drawing Sheets

FAST RESPONSE PROJECTILE ROLL ESTIMATOR

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to guided projectiles.

2. Description of the Related Art

Conventional artillery shells are projectiles that are fired from an artillery piece or other launcher and travel on a ballistic trajectory towards an intended target. A ballistic trajectory is a flight path that is governed by forces and conditions external to the projectile, such as the velocity provided at launch, gravity, air drag, temperature, wind, humidity, and other factors. A guided projectile is a projectile that exercises some degree of self-control over its trajectory. Guided projectiles typically deploy some form of control surfaces after launch and use these control surfaces to control the trajectory. Guided projectiles may home on some feature of the intended target, such as a reflection of a laser designator beam. Guided projectiles may be programmed to navigate to specific geographic coordinates using one or more of inertial sensors, GPS positioning, and other navigation methods.

Throughout this description, elements appearing in figures are assigned three-digit reference designators, where the most significant digit is the figure number where the element is introduced and the two least significant digits are specific to the element. An element that is not described in conjunction with a figure may be presumed to have the same characteristics and function as a previously-described element having the same reference designator.

DETAILED DESCRIPTION

Description of Apparatus

Figure 1:
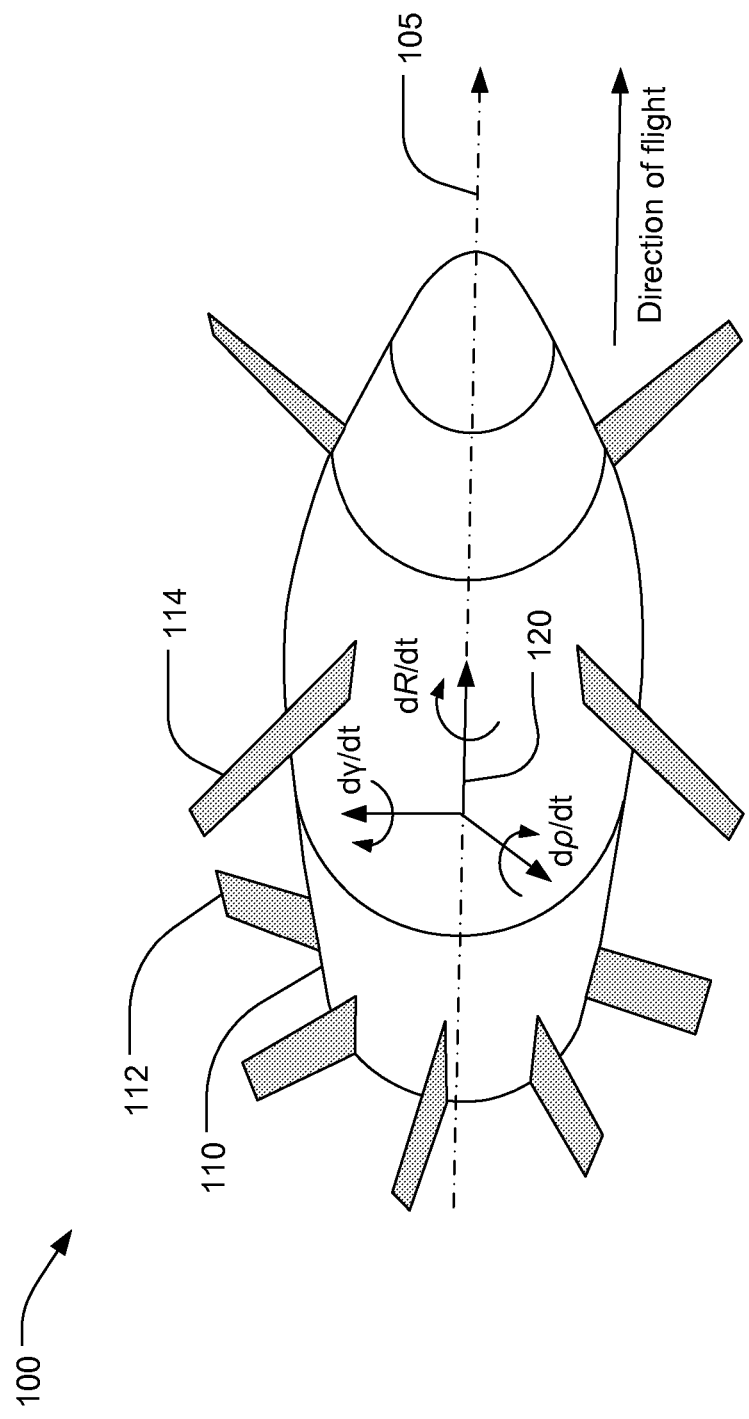
FIG. 1 is a perspective view of a guided projectile.

Referring now to FIG. 1, a guided projectile 100 may include a projectile body 110 which may be symmetrical about a longitudinal axis 105. The longitudinal axis 105 may be aligned with the direction of flight of the projectile at launch. The longitudinal axis 105 may deviate slightly from the direction of flight during subsequent guided flight. A plurality of fins 112 may extend from the projectile body. The fins 112 may be effective to stabilise the flight of the projectile. The fins 112 may extend from the projectile body 110 at or near the back of the projectile body 110.

One or more control surfaces 114 may extend from the projectile body 110. The one or more control surfaces 114 may be effective to control, to at least some degree, the flight of the projectile 100. In the example of FIG. 1, the control surfaces 114 are shown as a plurality of canards or fins extending from the projectile body 110 near the front of the projectile body 110. Other types of control surfaces, including drag brakes or scoops, wings, and fins disposed at other locations on the projectile body may be used to control the flight of the projectile. In some instances, the fins 112 may also function as the control surfaces 114.

The fins 112 and control surfaces 114 may be retained within the projectile body 110 prior to and during launch. The fins and control surfaces may not necessarily be enclosed by the projectile body but may be folded within the general outline of the projectile body such that the projectile may be launched from the barrel of an artillery piece or other launcher. The fins 112 and control surfaces 114 may be automatically or electively deployed or extended after launch. For example, the fins 112 may be automatically deployed after launch to stabilise the projectile. When the projectile 100 was launched with a high roll rate from a rifled gun barrel, the fins 112 may also be effective to reduce the projectile roll rate. With only the fins 112 deployed, the projectile 100 may follow a ballistic flight path. Subsequently, the control surfaces 114 may be electively deployed when the guided portion of the projectile flight begins.

The projectile body 110 may enclose an explosive payload (not shown) and a control system (not shown) to control the flight of the projectile using the control surfaces 114. The projectile body 110 may also enclose a navigation system which may include a measurement unit 120 to measure projectile motion parameters. The measurement unit 120 may measure angular rate about mutually orthogonal roll (R), pitch ($\rho$), and yaw ($\gamma$) axes. The R axis is typically aligned with the longitudinal axis 105 of the missile body 110. The $\rho$ and $\gamma$ axes may be aligned, after the control surfaces 114 are deployed, to the rotation axes of the control surfaces 114. The measurement unit 120 may include, for example, three gyroscopes or other rate sensors to measure rotation rate about the R, $\rho$ and $\gamma$ axes.

The missile body 110 may enclose other navigation equipment (not shown) such as a GPS receiver. The missile body 110 may also enclose one or more sensors (not shown), such as a semi-active laser (SAL) guidance system, to guide the projectile to a target.

Figure 2:
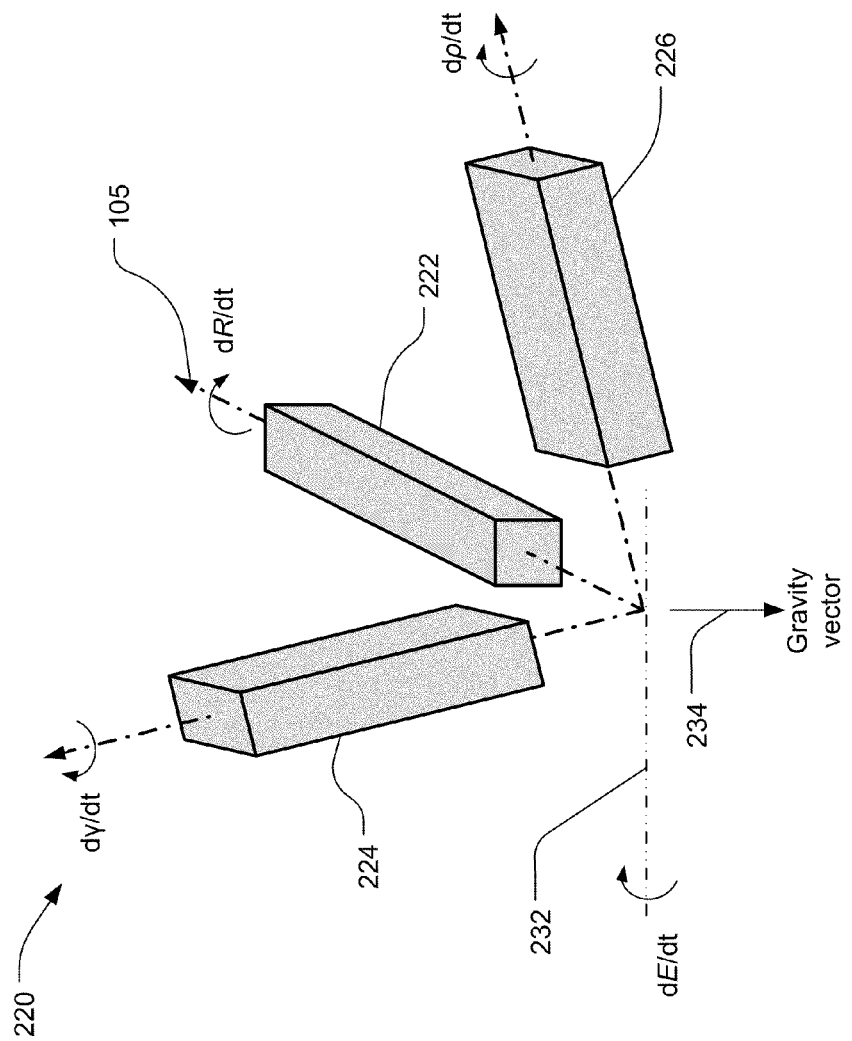
FIG. 2 is a perspective block diagram of an inertial measurement unit for a guided projectile.

FIG. 2 is a perspective block diagram of the measurement unit 220, which may be the measurement unit 120 and may be disposed within a projectile such as the projectile 100. The measurement unit 220 includes sensors 222, 224, and 226 disposed to measure rotation rates dR/dt, d$\rho$/dt, and d$\gamma$/dt about mutually orthogonal R, $\rho$, and $\gamma$ axes, respectively. Each of the sensors 222, 224, and 226 may include, for example, a gyroscope or other rate sensor to measure rotation rate about the respective axis. The gyroscopes may be implemented using MEMS (micro electro-mechanical system) technology, but other types of rotation rate sensors such as fiber gyroscopes may also be used. Each of the sensors 222, 224, and 226 may be "locked down" or in a fixed orientation with respect to the projectile body.

The R axis may be aligned with the longitudinal axis 105 of the projectile. The ρ and γ axes may be mutually orthogonal and orthogonal to the R axis. However, prior to deployment of the control surfaces 114, the ρ and γ axes may not be aligned in any particular orientation, but may change directions continuously due to roll, or rotation about the R axis, introduced during the launch of the projectile 100.

After the projectile is launched, the effect of gravity will cause the projectile to follow an arched ballistic trajectory with a continuous gradual change in elevation angle E over time. In this context, elevation angle is the angle between the direction of flight and the horizontal. The change in elevation angle E can be considered to be a rotation about a virtual axis 232 which is orthogonal to the direction of gravity (as indicated by the gravity vector 234) and orthogonal to the direction of flight of the projectile 100. The virtual axis 232 may not be exactly orthogonal to the longitudinal axis 105 of the projectile since the longitudinal axis 105 may not be precisely aligned with the direction of flight. The angular relationship between the gravity vector 234 and the ρ and γ axes may change continuously due to the roll of the projectile.

The elevation rotation rate dE/dt about the virtual axis 232 (the rate of change of the elevation angle) will have a component about each of the ρ and γ axes. Thus the angles between the gravity vector 234 and the ρ and γ axes may be estimated from the rotation rates dρ/dt and dγ/dt measured by the sensors 226 and 224, respectively. More correctly, since the direction of the gravity vector is fixed, the orientation of the ρ and γ axes, or the roll orientation of the projectile, with respect to the gravity vector may be estimated from the rotation rates dρ/dt, and dγ/dt measured by the sensors 224 and 226. The roll orientation of the projectile can only be estimated since the rotation rates measured by the sensors 224 and 226 may include contributions from coning, nutation, vibration, or other non-ballistic movements of the projectile, which will be referred to herein collectively as perturbations, and contributions from noise in the measurement unit.

Figure 3:
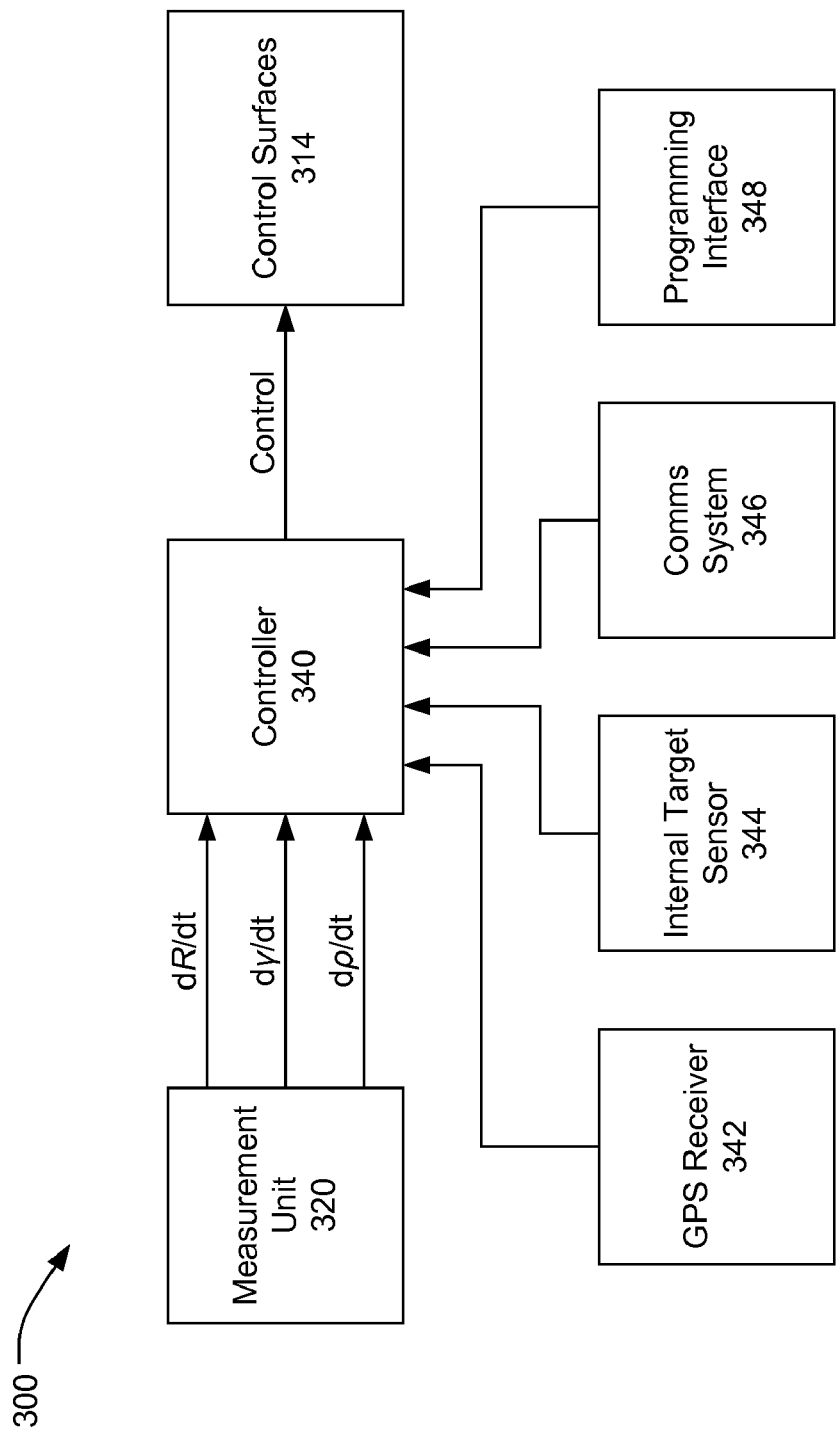
FIG. 3 is a block diagram of a guided projectile.

Referring now to FIG. 3, a guided projectile 300, which may be the guided projectile 100, may include a measurement unit 320, such as the measurement unit 220, a controller 340, and control surfaces 314. The control surfaces 314 may be, for example, canards as shown in FIG. 1 or other control surfaces.

The measurement unit 320 may provide the controller 340 with signals indicative of rotation rates dR/dt, dρ/dt, and dγ/dt about mutually orthogonal R, ρ, and γ axes. In this context, the term "signals" includes analog signals, digital data, and combinations of analog and digital information that may be communicated from the measurement unit 320 to the controller 340 electrically, optically, wirelessly or by some other mechanism. The controller 340 may control the control surfaces 314 based on, at least in part, the dR/dt, dρ/dt, and dγ/dt signals provided by the measurement unit 320.

The guided projectile 300 may include one or more of a GPS receiver 342 or other navigation system, a target sensor 344, and a communications system 346. The controller 340 may also control the control surfaces 314 based on, at least in part, information from one or more of the GPS receiver 342, the target sensor 344, and/or the communications system 346. The guided projectile 300 may also include a programming interface 348 used to input mission data to the controller 340. For example, the controller 340 may receive target coordinates via the programming interface prior to launch. After launch, the controller 340 may use position data from the GPS receiver 342 and signals from the measurement unit 320 to control the control surfaces 314 such that the guided projectile 300 is guided to the intended target location.

In order to guide the projectile to the target, the controller 340 may need to know, or closely estimate, the roll orientation of the projectile 300 with respect to the gravity vector or the true vertical direction. In other words, in order to guide the projectile 300 to move up, down, left, or right in order to reach the target, the controller first has to understand where up, down, left, and right actually are with respect to the projectile at any given instant. The controller may estimate the roll orientation with respect to the gravity vector from the dR/dt, dρ/dt, and dγ/dt signals received from the measurement unit 320.

The controller 340 may include software, firmware, and/or hardware for providing functionality and features described herein. The hardware and firmware components of the controller 340 may include various specialized units, circuits, software and interfaces for providing the functionality and features described here. The controller 340 may therefore include one or more of: memories, analog circuits, digital circuits, and processors such as microprocessors, field programmable gate arrays (FPGAs), application specific integrated circuits (ASICs), programmable logic devices (PLDs) and programmable logic arrays (PLAs). The functionality and features of the controller 340 may be embodied in whole or in part in software which operates on one or more processors within the controller 340 and may be in the form of firmware, an application program, an applet (e.g., a Java applet), a dynamic linked library (DLL), a script, one or more subroutines, or an operating system component or service. The hardware and software and their functions may be distributed such that some functions are performed by the controller 340 and others by other devices.

Description of Processes

Figure 4:
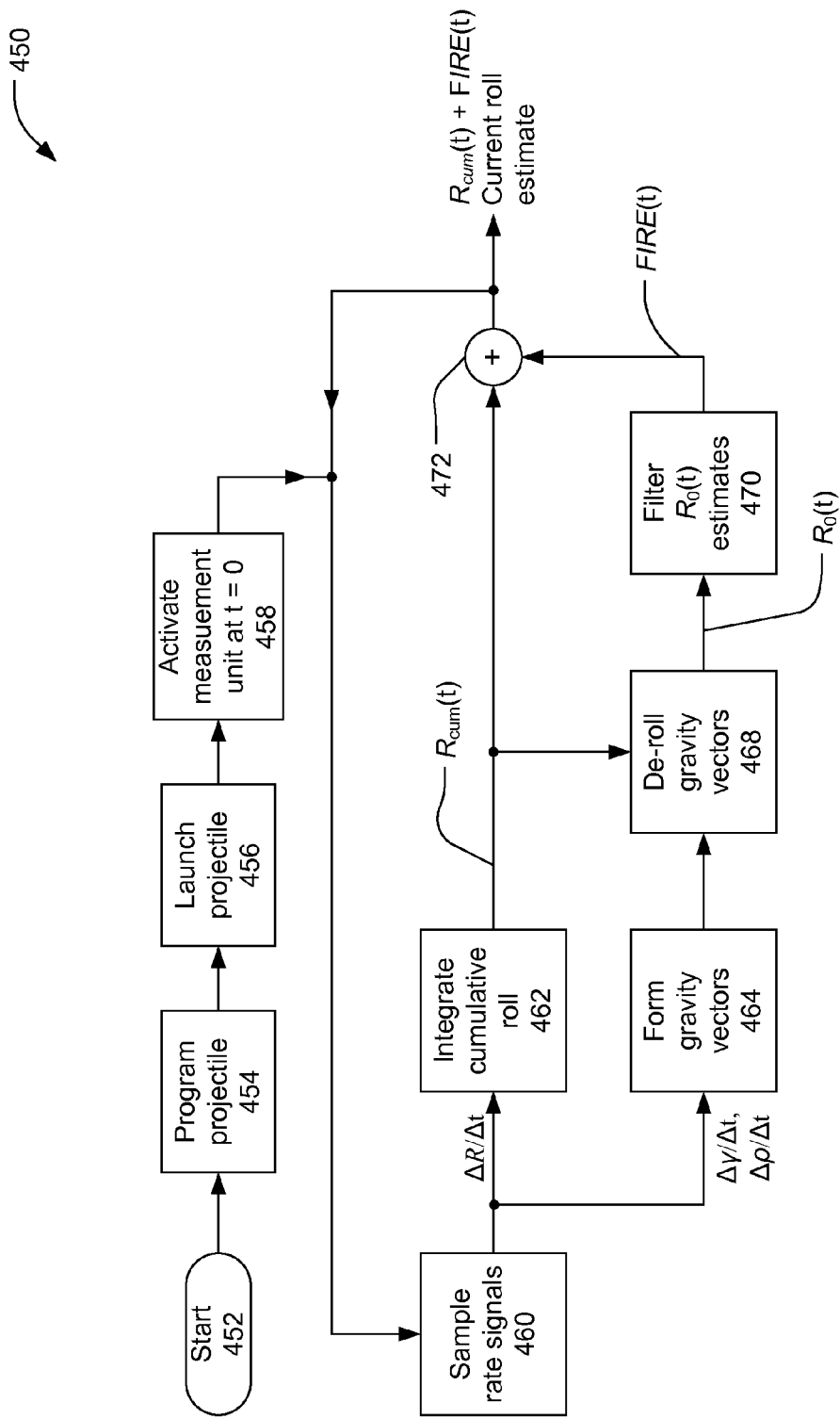
FIG. 4 is a flow chart of a method for estimating the roll of a projectile.

Referring now to FIG. 4, a process 450 for estimating the roll orientation of a projectile may start at 452 and continue throughout the flight of the projectile. The process 450 may be cyclical in nature, and the actions from 460 to 472 may be performed iteratively throughout the flight of the projectile. The actions from 460 to 472 may be performed in near real time, where "near real time" means that the delay through the actions 460 to 472 is small compared to a roll period of the projectile.

The process 450 may start at 452 with a guided projectile ready to be launched against a target. At 454, the guided projectile may be programmed, which may include programming a target location or other mission instructions into a controller, such as the controller 340, within the projectile and programming a projectile fuse. At 456, the projectile may be launched. For example, the projectile may be launched from an artillery gun barrel, or by a rocket motor, or by some other mechanism. At 458, a measurement unit, such as the measurement unit 320, may be activated. The measurement unit may be inactive prior to 458 to protect sensors within the measurement unit from extremely high acceleration that may occur during the projectile launch at 456. The measurement unit may be activated at 458 at a predetermined time after projectile launch. For the purpose of discussion, the time at which the measurement unit is activated is considered to be time=0.

At 460, dR/dt, dρ/dt, and dγ/dt rate signals provided by the measurement unit may be sampled. At 462, successive roll rate samples ΔR/Δt may be integrated, or summed, to produce a cumulative roll value, $R_{cum}(t)$, indicative of the total roll of the projectile since time t=0.

Figure 5C:
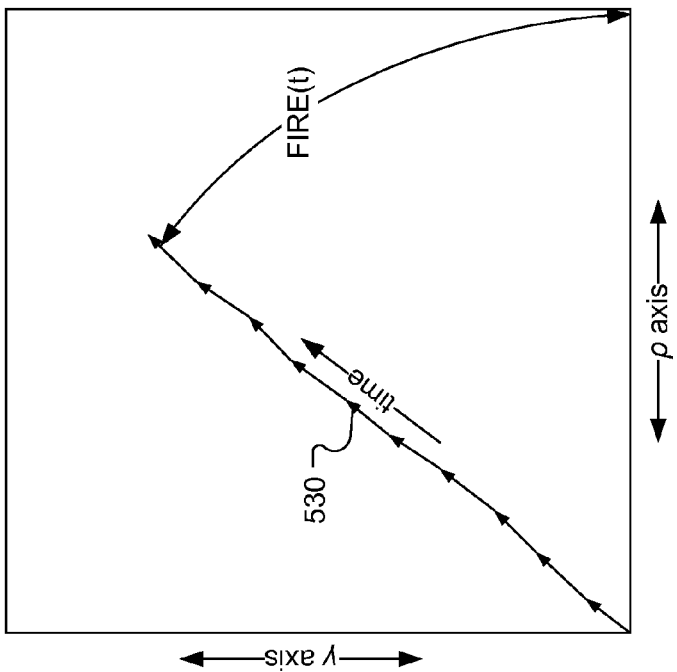
FIG. 5C is a diagram of filtered de-rolled gravity vector estimates.
Figure 5A:
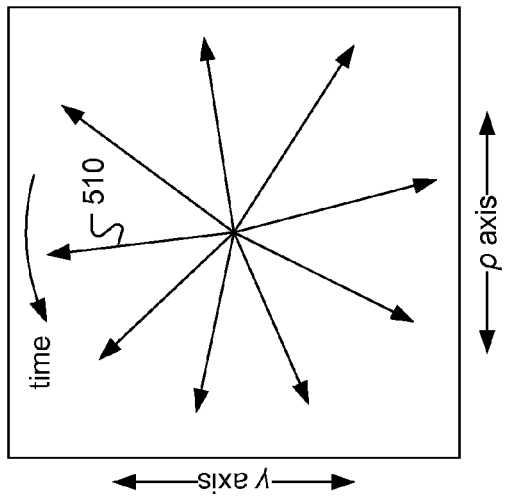
FIG. 5A is a diagram of time-sequential gravity vector estimates.

At 464, gravity vectors may be determined from the successive pitch rate and yaw rate samples Δρ/Δt and Δγ/Δt. As previously described, the projectile will experience a continuous change in elevation angle in flight due to the effects of gravity. The rate of change of elevation angle may have a component about each of the pitch and yaw axes such that the direction of the gravity vector may be estimated from the pitch and yaw rate samples $\Delta\rho/\Delta t$ and $\Delta\gamma/\Delta t$. FIG. 5A shows a hypothetical example of time-sequential gravity vector estimates 510. The magnitude of each time-sequential gravity vector is nearly constant and the angle of the gravity vector changes with each successive sample due, in large part, to the roll of the projectile. The change in angle between successive gravity vectors may also be due, in part, to perturbations in the motion of the projectile and noise in the measurement unit.

Figure 5B:
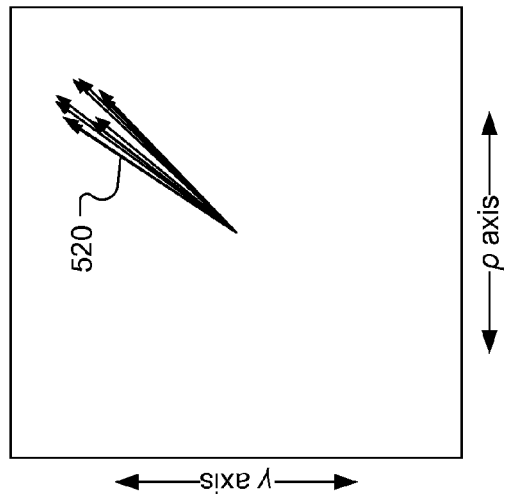
FIG. 5B is a diagram of time-sequential de-rolled gravity vector estimates.

Referring back to FIG. 4, at 468 each successive gravity vector may be de-rolled back to time=0 by subtracting the corresponding cumulative roll estimate $R_{cum}(t)$. Subtracting the corresponding cumulative roll estimate from the angle of each new gravity vector estimate essentially rolls the gravity vector backwards to time t=0. Each de-rolled gravity vector provides an estimate $R_0(t)$ of the initial roll angle (the roll angle at time t=0) of the projectile. FIG. 5B shows time-sequential initial roll angle estimates 520 developed from the gravity vector estimates of FIG. 5A. If the projectile was following a perfect ballistic trajectory without perturbations and noise, the plurality of initial roll angle estimates 520 would be superimposed.

Referring back to FIG. 4, at 470 the time sequence of initial roll estimates may be filtered to reduce the effects of perturbations and noise to produce a filtered initial roll estimate FIRE(t). In this context, the term "filtered" means any processing that may be performed to reduce the influence of perturbations and noise on the value of FIRE(t). One technique for filtering the initial roll estimates may be to integrate the successive initial roll estimates, as shown in FIG. 5C. Integrating the initial roll estimates may reduce the contribution of perturbations and noise by averaging.

Referring back to FIG. 4, at 472 the filtered initiate roll estimate FIRE(t) may be added to the cumulative roll estimate $R_{cum}(t)$ to provide a current roll estimate that may be used to control the flight of the projectile. The process 450 may then repeat cyclically from 460.

Figure 6:
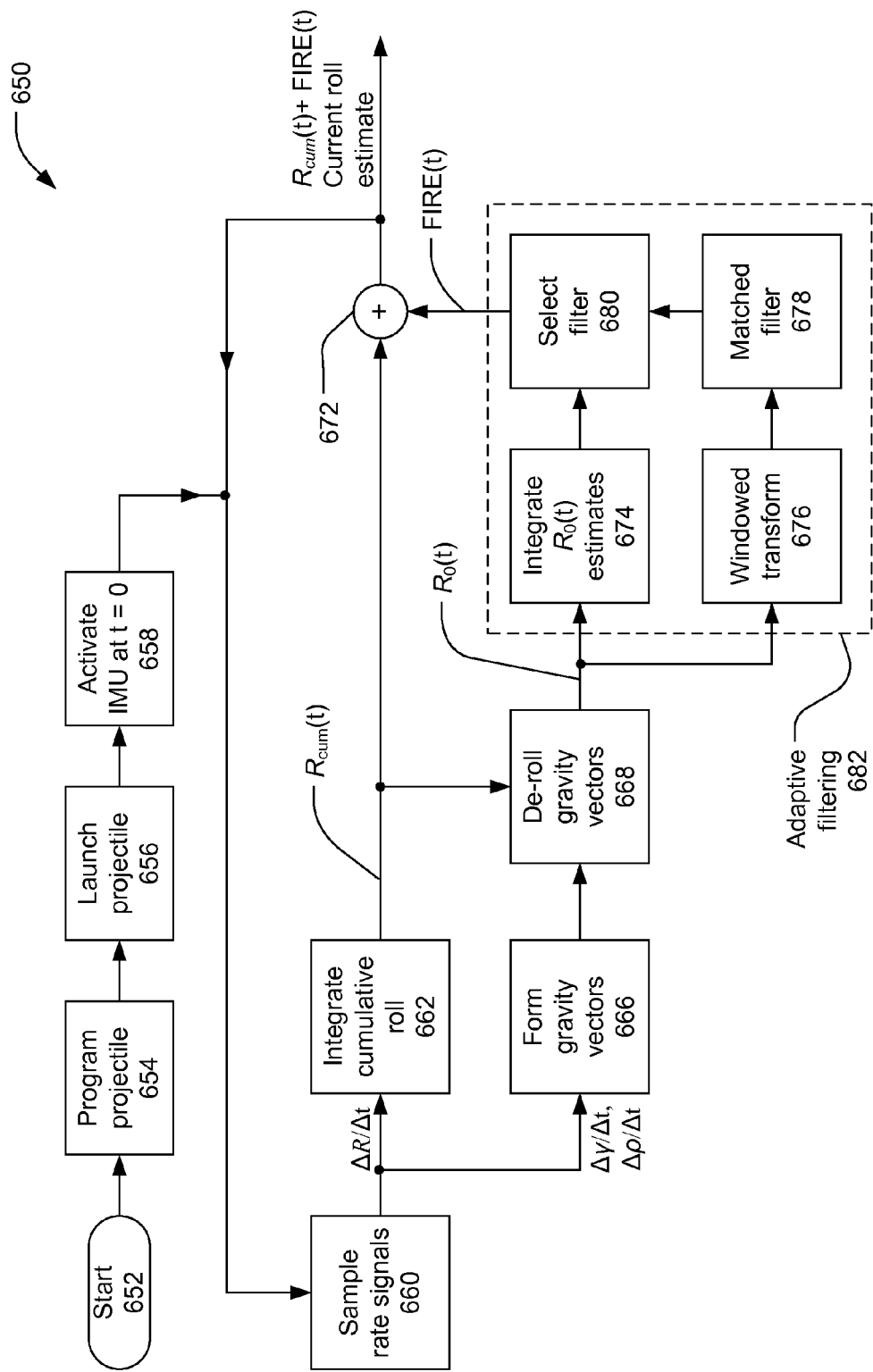
FIG. 6 is a flow chart of another method for estimating the roll of a projectile.

Referring now to FIG. 6, another process 650 for estimating the roll angle of a projectile may adaptively filter (at 682) time-sequential initial roll estimates (at 682) to reduce the effects of perturbations and noise. In the process 650, the actions 652 to 668 and 672 are essentially the same as the corresponding actions within the process 450. The description of these actions will not be repeated.

The adaptive filtering at 682 may include at least one filter technique that adapts to the perturbations and/or noise incorporated into the initial roll estimates $R_0(t)$. The adaptive filtering at 682 may incorporate a plurality of filtering techniques and the outputs of one or more filtering techniques may be selected and/or combined based on the characteristics of the initial roll estimates $R_0(t)$.

For example, the adaptive filtering at 682 may include integrating the time-sequential initial roll estimates at 674. In addition, a windowed Fourier transform may be performed at 676 to identify the primary frequency components of the perturbations or noise. The time-sequential initial roll estimates may then be filtered at 678 using a filter matched to one or more frequency component identified at 676. For example, a primary coning or nutation frequency may be identified at 676 and the filter at 678 may be adapted or matched to attenuate the primary nutation frequency. As an example of matched filtering, at 678 a moving average of n consecutive integrated initial roll estimates may be calculated, where $\Delta t$ is a time interval between successive samples and $(n)(\Delta t)$ is approximately equal to the period of the primary coning frequency.

Thus the output of 678 may be formed with the vector between the average of the first n samples of the integral and the average of the last n samples of the integral. Thus the beginning and end points are averaged over a time period equal to a full period of primary coning frequency, thus effectively canceling or substantially attenuating the effect of the coning motion while maintaining the noise suppression characteristics of the integral of all input samples. At 680, the result from 674 or the result from 678 may be selected as the filtered initial roll estimate FIRE(t). The selection at 680 may be based on the characteristics of the initial roll estimates $R_0(t)$ or on the results from 674, 676, and/or 678. For example, the result from 678 may be selected if the amplitude of the primary coning motion, as determined at 676, exceeds a predetermined value and the results from 674 may be selected if the amplitude of the primary coning motion does not exceed a predetermined value.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

For means-plus-function limitations recited in the claims, the means are not intended to be limited to the means disclosed herein for performing the recited function, but are intended to cover in scope any means, known now or later developed, for performing the recited function.

As used herein, "plurality" means two or more.

As used herein, a "set" of items may include one or more of such items.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

As used herein, "and/or" means that the listed items are alternatives, but the alternatives also include any combination of the listed items.

It is claimed:

1. An apparatus for estimating a roll angle of a projectile, comprising:
   a measurement unit disposed within the projectile, the measurement unit outputting roll rate, yaw rate, and pitch rate signals indicative of rotation rates about substantially orthogonal roll, yaw, and pitch axes, the roll axis substantially aligned with a longitudinal axis of the projectile; and a controller disposed within the projectile, the controller for estimating the roll angle by:
   sampling the roll rate, yaw rate, and pitch rate signals to obtain time sequential roll rate, yaw rate, and pitch rate samples,
   calculating time sequential cumulative roll estimates by summing the roll rate samples,
   calculating time sequential gravity vector estimates from the corresponding yaw rate and pitch rate samples,
   de-rolling each gravity vector estimate based on the corresponding cumulative roll estimate,
   filtering the de-rolled gravity vector estimates to determine a filtered initial roll estimate, and
   adding the filtered initial roll estimate to a current cumulative roll estimate to provide a current roll angle estimate.

2. The apparatus for estimating a roll angle of a projectile of claim 1, wherein filtering the de-rolled gravity vector estimates comprises integrating the de-rolled gravity vector estimates.

3. The apparatus for estimating a roll angle of a projectile of claim 1, wherein filtering the de-rolled gravity vector estimates comprises:
   determining a primary coning frequency
   processing the de-rolled gravity vector estimates to reject the primary coning frequency.

4. The apparatus for estimating a roll angle of a projectile of claim 3, wherein determining a primary coning frequency comprises a windowed Fourier transform.

5. The apparatus for estimating a roll angle of a projectile of claim 3, wherein processing the de-rolled gravity vector estimates comprises forming a moving average of the integral of the de-rolled gravity vector estimates with an averaging time period equal to the period of the primary coning frequency.

6. The apparatus for estimating a roll angle of a projectile of claim 1, wherein filtering the de-rolled gravity vector estimates comprises:
   integrating the de-rolled gravity vector estimates;
   processing the de-rolled gravity vector estimates to reject a primary coning frequency; and
   selecting either the integrated de-rolled gravity vector estimates or the processed de-rolled gravity vector estimates as the initial roll orientation.

7. The apparatus for estimating a roll angle of a projectile of claim 6, wherein the selecting is based on a coning amplitude.

8. A method for estimating a roll angle of a projectile, comprising:
   sampling roll rate, yaw rate, and pitch rate signals provided by a measurement unit to obtain time sequential roll rate, yaw rate, and pitch rate samples,
   calculating time sequential cumulative roll estimates by summing the roll rate samples,
   calculating time sequential gravity vector estimates from the corresponding yaw rate and pitch rate samples,
   de-rolling each gravity vector estimate based on the corresponding cumulative roll estimate,
   filtering the de-rolled gravity vector estimates to determine a filtered initial roll estimate, and
   adding the filtered initial roll estimate to a current cumulative roll estimate to provide a current roll angle estimate.

9. The method for estimating a roll angle of a projectile of claim 8, wherein filtering the de-rolled gravity vector estimates comprises integrating the de-rolled gravity vector estimates.

10. The method for estimating a roll angle of a projectile of claim 8, wherein filtering the de-rolled gravity vector estimates is performed with an adaptive filter.

11. The method for estimating a roll angle of a projectile of claim 8, wherein filtering the de-rolled gravity vector estimates comprises:
   determining a primary coning frequency
   processing the de-rolled gravity vector estimates to reject the primary coning frequency.

12. The method for estimating a roll angle of a projectile of claim 11, wherein determining a primary coning frequency comprises a windowed Fourier transform.

13. The method for estimating a roll angle of a projectile of claim 11, wherein processing the de-rolled gravity vector estimates comprises forming a moving average of the integral of the de-rolled gravity vector estimates with an averaging time period equal to the period of the primary coning frequency.

14. The method for estimating a roll angle of a projectile of claim 8, wherein filtering the de-rolled gravity vector estimates comprises:
   filtering the de-rolled gravity vector estimates using a plurality of filters to provide a corresponding plurality of filter results;
   selecting one of the plurality of filter results as the filtered initial roll estimate.

15. The method for estimating a roll angle of a projectile of claim 14, wherein the plurality of filters comprises:
   a first filter that integrates the de-rolled gravity vector estimates; and
   a second filter that processes the de-rolled gravity vector estimates to reject a primary coning frequency.

16. The method for estimating a roll angle of a projectile of claim 15, wherein either the integrated de-rolled gravity vector estimates or the processed de-rolled gravity vector estimates is selected as the filtered initial roll estimate based on a coning amplitude.

* * * * *